(12) United States Patent
Boiko et al.

(10) Patent No.: US 6,818,052 B1
(45) Date of Patent: Nov. 16, 2004

(54) METHOD FOR PRODUCTION OF IRON IOXIDE PIGMENTS

(75) Inventors: Vladimir Boiko, Kiryat-Malakly (IL); Marlen Oryol, Bnei Brak (IL); Boris Oryol, Tashkent (UZ)

(73) Assignee: Biopigment Ltd., Kiryat Arba (IL)

( * ) Notice: Subject to any disclaimer, the term of this patent is extended or adjusted under 35 U.S.C. 154(b) by 0 days.

(21) Appl. No.: 10/110,989

(22) PCT Filed: Oct. 19, 2000

(86) PCT No.: PCT/IL00/00661

§ 371 (c)(1),
(2), (4) Date: Jun. 27, 2002

(87) PCT Pub. No.: WO01/28929

PCT Pub. Date: Apr. 26, 2001

(30) Foreign Application Priority Data

Oct. 21, 1999 (IL) .................................................. 132506

(51) Int. Cl.$^7$ ........................ C01G 49/06; C01G 49/08; C01B 25/37; C01C 3/12; C09C 1/24
(52) U.S. Cl. ...................... 106/456; 106/458; 423/633; 423/632
(58) Field of Search ................................. 106/456, 458; 423/633, 632, 558, 154, 153, 146

(56) References Cited

U.S. PATENT DOCUMENTS

| | | |
|---|---|---|
| 3,969,494 A | 7/1976 | Nobuoka et al. |
| 4,113,508 A | 9/1978 | Einerhand et al. |
| 4,309,480 A | 1/1982 | Armanini |
| 4,349,385 A | 9/1982 | Huisman et al. |
| 4,378,995 A | 4/1983 | Gratzfeld et al. |
| 4,631,089 A | 12/1986 | Rademachers et al. |
| 4,911,760 A | 3/1990 | Burow et al. |
| 5,013,365 A | 5/1991 | Rademachers et al. |
| 5,185,141 A | 2/1993 | Krockert et al. |
| 6,294,362 B1 * | 9/2001 | Sharp et al. ................. 435/174 |

FOREIGN PATENT DOCUMENTS

| | | | |
|---|---|---|---|
| GB | 1245169 A | | 9/1971 |
| GB | 1245169 | * | 9/1971 |
| WO | WO 99/37719 A | | 7/1999 |

OTHER PUBLICATIONS

Byrappa et al, "Handbook of Hydrothermal Technology", 2001, p. 7–8.*
Pagella et al, "Iron oxide Pigments Production by Biological Oxidation Process", An. Quam. nt. Ed. vol. 92 (4), 1996, pp. 202–209.*
Dvoskina et al., "Preparation of iron (III) hydrogen phosphates" retrieved from STN Database accession No. 113:26404 XP002160227 (1990) (1 page total). Database Chemabs [Online] Chemical Abstract Service, Columbus, Ohio, US.
Kida et al., "Highly dispersable ferrite powder" retrieved from STN Database accession No. 105:53360 XP002160226 (1986) (1 page total). Database Chemabs [Online] Chemical Abstract Service, Columbus, Ohio, US.
Silverman et al., "Studies on the chemoautotrophic iron bacterium *Ferrobacillus ferrooxidans*" Bacteriology (1959) 77:642–647.

* cited by examiner

*Primary Examiner*—C. Melissa Koslow
(74) *Attorney, Agent, or Firm*—Townsend and Townsend and Crew LLP

(57) ABSTRACT

The invention provides a process for the production of iron based pigments and anticorrosive additives from elemental iron comprising: a) reacting iron Fe° with ferric sulphate $Fe_2(SO_4)_3$ and with sulfuric acid $H_2SO_4$ to produce ferrous sulphate $FeSO_4$; b) oxidizing ferrous sulphate $FeSO_4$ in a bacterial solution containing at $10^7$ bactrial cells of thiobacillus ferrooxidans per 1 ml of solution under aerobic conditions to produce ferric oxide sulphate $Fe_2(SO_4)_3$; c) reacting said ferric oxide sulphate $Fe_2(SO_4)_3$ with water, to precipitate iron oxide monohydrate $Fe_2O_3 \times H_2O$; and d) re-cycling the solution from step c, to step a, to utilize the sulphuric acid and a portion of the ferruos sulphate values therein.

9 Claims, No Drawings

METHOD FOR PRODUCTION OF IRON IOXIDE PIGMENTS

The present invention relates to the production of synthetic iron based pigments and anticorrosive additives.

Conventional chemical methods for the production of synthetic iron oxide pigments are Known (See. e.g. T. C. Patton: "Pigment Handbook 1988. vol.1. Second Edition. Properties and Economics, pp. 297–302". U.S. Pat. Nos. 4,911,760, 5,268,640, 3,969,494, 5,185,141, 4,349,385; O. V. Orlova and T. N. Fomitcheva:" Paints and Lacquers Technology, 1990, Moscow, "Chemistry", pp. 294–302). As a raw materials for such production, there is used ferrous sulfate ($FeSO_4 7H_2O$), sodium hydroxide (NaOH) and very high quality iron filings ($Fe^0$). In the first step of this method, the ferrous sulfate is reacted with sodium hydroxide in order to produce a ferrous hydroxide (Fe $(OH)_2$ suspension. The second step is the oxidation of $Fe(OH)_2$ by air at a temperature of about 85–90° C. in the presence of about 10% of the separately prepared nuclei suspensions of goethite ($\alpha$-FeOOH).

During the oxidation, $Fe(OH)_2$ transforms into $\alpha$-FeOOH yellow iron monohydroxide pigment. At this time of oxidation, the solution's pH changes from about 9.5–10.0 to about 4.0–4.5. In order to prevent the pH decrease and precipitation of ferric sulfate basic salts, it is necessary to continuously add high quality iron filings into the solution. In this manner, elementary iron reacts with the formed sulfuric acid and prevents the decrease in the solution's pH. The complete oxidation of $Fe^{2+}$ into $Fe^{3+}$ takes place in about 5–18 hours. The third step of this method is to allow for the growth of pigment particles according to predetermined standards. Thereafter, the pigment is separated from the solution ($Na_2SO_4$) by filtration, washed and dried. As a result of this chemical method, there is produced a yellow iron oxide pigment with particle size of about 0.1–0.3× 0.5–0.9 microns. The pigment particles have needle or prismatic form. Mineralogically, this is characterized as a goethite ($\alpha$-FeOOH) form. The by-product of this process is sodium sulfate. In order to produce a red iron oxide, it is necessary to calcine the produced yellow iron oxide at a temperature of about 400–450° C. Red iron oxide is hematite ($Fe_2O_3$).

The disadvantages of the existing chemical technology of the aforementioned yellow iron oxide pigment production are:

The need for high quality initial raw materials since at high alkaline conditions of reaction almost all of the metals accompanying iron production are precipitated and pollute the iron oxide pigment.

The need for a special nucleuses suspension's preparation which is an independent and expensive technological operation, including Fe $(OH)^2$ complete oxidation and transformation into $\alpha$-FeOOH at the temperature of about 85–90° C.

Long process duration of $Fe(OH)_2$ oxidation, utilizing significant quantities of required air and requiring the maintenance of a high solution temperature.

Necessity of the constant use of the extremely pure metal iron: for the pigment quality's stabilization, for the maintenance of pH at a determined level and for the prevention of the basic iron sulfate salts' precipitation together with pigment.

Formation of needle or prismatic forms of particles, worsening the pigment's properties.

$Na_2SO_4$ formed as a result of the reaction as a by-product is a practically useless, cheap product and its pollution is harmful for the environment.

The present invention provides a process for the preparation of yellow and other iron-based pigments which does not suffer from the above-mentioned drawbacks. It is much cheaper, ecologically clean and allows to produce very high quality yellow and red iron oxide pigments from low quality initial raw material such as iron waste. At the same time the present process enables the production of other iron-based pigments and anticorrosive additives, such as a black iron oxide pigment (magnetite), Prussian blue and ferric monophosphate (anticorrosive additive) with a minimal added expense.

Thus, according to the present invention, there is now provided a process for the production of iron based pigments and anticorrosive additives from elemental iron comprising:

a. reacting iron $Fe^0$ with ferric sulphate $Fe_2(SO_4)_3$ and with sulfuric acid $H_2SO_4$ to produce ferrous sulphate $FeSO_4$:

b. oxidizing ferrous sulphate $FeSO_4$ in a bacterial solution containing sulfuric acid and at least $10^7$ bacterial cells of thiobacillus ferrooxidans per 1 ml of solution under aerobic conditions to produce ferric sulphate $Fe_2(SO_4)_3$:

c. reacting said ferric sulphate $Fe_2(SO_4)_3$ with water at a temperature of about 65 to 130° C., to precipitate iron oxide monohydrate $Fe_2O_3 \times H_2O$; and d. re-cycling the solution from step c, to step a, to utilize remaining sulphuric acid and a portion of unhydrolyzed ferric sulphate values therein.

As an initial raw material, there is preferably used iron waste or iron filings, containing from 40 to 100% of elementary iron.

Preferably, the process proceeds at ambient (10–35° C.) temperature in aerobic acidic (pH 1.0–2.9) sulfate environments, at the concentration of iron in working solutions from less 10 up to 40 g/l of iron. The biochemical reaction of ferrous sulfate's oxidation is shown below:

$2FeSO_4+2H_2SO_4+O_2+Th.ferrooxidans=2Fe_2(SO_4)_3+2H_2O$

Produced by bacterias the ferric sulfate solution is used as an oxidizer and further its portion is used for primary iron oxidation and production of the ferrous sulfate:

$Fe+Fe_2(SO_4)_3=3FeSO_4$

In the proposed biotechnical reaction, the iron's oxidation speed depends on the quantity of bacteria cells in the solution. According to the present invention, it was established, that for the achievement of the economically favorable oxidation's speed (about 1 g of iron in 1 liter of a solution during 3 hours) it is necessary to have no less than $10^7$ bacterias cells in 1 ml of the solution. At such concentration of the cells a ratio between incoming ferrous sulfate solution and bacterial suspension of the fermenter is preferably about 1:10. The increase of this ratio for the benefit of the ferrous sulfate solution delays the oxidation's speed. A lack of the ferrous sulfate feed brings to the decrease of the bacterias cells and premature bacterias decease.

During the bacterias vital activitys the resulting solution consists of three main components, i.e. sulfuric acid, ensuring of the solution's pH in the interval 2.1–2.8, colloidal particles of iron hydroxide Fe $(OH)_3$, formed as a result of ferric sulfate partial hydrolysis, and unhydrolyzed ferric sulfate. This product is the initial raw material for the production of all above mentioned pigments and anticorrosive additives, e.g. yellow ($\alpha$-FeOOH), red ($Fe_2O_3$), black ($Fe_3O_4$), Prussian blue ($Fe_4(Fe(CN)_6)_3$) and ferric dihydrogen phosphate ($Fe(H_2PO_4)_3$).

Before its further use the solution is separated from bacteria by filtration, and the separated bacteria is recycled into the fermenter. About 30% of iron is in a colloidal form as a phase of Fe (OH)$_3$, formed as a result of the partial ferric sulfate hydrolysis which step by step takes place within the fermenter in the presence of a surplus of water, according to the reaction:

$$Fe_2(SO_4)_3 + 6H_2O = 2Fe(OH)_3 + 3H_2SO_4$$

The form of the colloidal particle is spherical. Therefore, if the pigment's production occurs without additional ferric sulfate hydrolysis, formed α-FeOOH has the inherited spherical form of particles. An additional hydrolysis of the remaining ferric sulfate results in the formation of the particles in form of needles. Therefore it is possibility to produce the yellow iron oxide pigment with only spherical particles or as a mixture of spherical and needle particles.

Depending on the requirement, the solution produced by the bacteria treatment can be used as follows:

a) For the manufacture of yellow iron oxide pigment this solution is exposed to treatment at a temperature range of about 65–130° C. for about 1.5–2 hours. As a result of this treatment the colloidal solution of Fe(OH)$_3$ coagulates and transforms into α-FeOOH (goethite). Thus the solution's pH is reduced from 2.10–2.8 to 1.5–1.8[.] Other metals, if they also contain a solution, cannot precipitate because at the given interval of pH only the ferric sulfate is hydrolyzed. After treatment at a temperature range of about 65–130° C. for about 1.5–2 hours the precipitated yellow iron oxide pigment is separated from the solution with filtration, washed until a pH of about 5.5–6.0 is reached and dried. The yellow iron oxide pigment produced consists of spherical, or spherical and needle particles which have the size of about 20–120 nm. After the filtration, there remains a solution of unhydrolyzed ferric sulfate, sulfuric acid, and also water with a pH of about 1.5–1.8 which is recycled to the beginning of the process for participation in the oxidation of the iron filings and in order to produce again the ferrous sulfate solution.

b) For the manufacture of iron oxide pigment (Fe$_2$O$_3$) there can be used the manufactured yellow iron oxide pigment. For this purpose the yellow pigment is calcined at the high temperatures of about 400 up to 800° C. The calcination's temperature depends on the red pigment shade;

c) For the manufacture of the black iron oxide pigment (Fe$_3$O$_4$) they are used two solutions: ferrous sulfate and ferric sulfate. The first solution is taken from the first step of iron oxidation and the second solution is taken from the fermenter. After mixing, the ratio of Fe$^{2+}$ and Fe$^{3+}$ should be 1:2 as in a magnetite. The prepared ferrous and ferric sulfate mixture is reacted with a stoichiometric quantity of the ammonium hydroxide. This reaction takes place at ambient temperature according to the following reaction scheme:

$$Fe_2(SO_4)3 + FeSO_4 + 4NH_4OH = Fe_3O_4 + 4(NH_4)_2SO_4 + 4H_2O$$

Instead of ammonium hydroxide any other alkali can be used. After reaction the precipitated black iron oxide is separated from the solution with filtration, washed at a pH of about, 6–7 and dried. The product is in the form of spherical particles with sizes from about 20 up to 150 nm. The ammonium sulfate solution remaining after filtration is condensed, crystallized and separately recovered.

d) For the manufacture of Prussian blue pigment there is used the completely oxidized solution from the fermenter which is reacted with a stoichiometric quantity of potassium ferrocyanide (yellow) at ambient temperature according to the following reaction scheme, $$2Fe_2(SO_4)_3 + 3K_4(Fe(CN)_6) = Fe_3(Fe(CN)_6)_3 + 6K_2SO_4$$

As a result of the chemical reaction, Prussian blue pigment is precipitated. The precipitate is separated from solution with filtration, is washed and dried. As a by-product in this case, potassium sulfate is produced. It can be condensed, crystallized and separately recovered and used as a fertilizer.

e) For the manufacture of ferric phosphates anticorrosive additives there is used the completely oxidized solution from the fermenter at ambient temperature. This solution is reacted with a stoichiometric quantity of the potassium dihydrogen phosphate according to the following reaction scheme:

$$Fe_2(SO_4)_3 + 2KH_2PO_4 2Fe(H_2PO_4)_3 + K_2SO_4$$

As a result of the chemical reaction a white precipitate of ferric dihydrogen phosphate is formed. This precipitate is filtered, washed and dried. As a by-product in this case potassium sulfate solution is produced. It can be condensed, crystallized and separately recovered and used as a fertilizer.

In British Patent 1,245,169 there is described and claimed a process for converging elemental iron and ferrous iron to high purity ferric oxide which comprises cultivating an iron-oxidizing bacterium at a pH of from 2.2 to 3 and a temperature of from 15 to 40° C. under aerobic conditions in an aqueous nutrient medium containing elemental iron and ferrous sulfate equivalent to at least one gram per liter of ferrous iron, and recovering the hydrous ferric oxide which precipitates. Said Patent, however, results in the precipitation of Fe(OH)$_3$ and as explained hereinbefore and does not teach or suggest the step of reacting said ferric sulphate Fe$_{2(SO4)_3}$ with water at a temperature of about 65 to 130° C., to precipitate iron oxide monohydrate Fe$_2$O$_3$× H$_2$O; and which results in the production of very pure crystalline and nannometric goethite (FeOOH) particles.

While the invention will now be described in connection with certain preferred embodiments in the following examples so that aspects thereof may be more fully understood and appreciated, it is not intended to limit the invention to these particular embodiments. On the contrary, it is intended to cover all alternatives modifications and equivalents as may De included within the scope of the invention as defined by the appended claims. Thus, the following examples which include preferred embodiments will serve to illustrate the practice of this invention it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

For the production of iron oxide pigments from iron waste the laboratory pilot installation was constructed, including the following apparatus:

1. A 120 liter container for iron waste oxidation and ferrous sulfate solution production.
2. Three vessels connected in series with a total volume of 1000 liters as a fermenter for bacterias Thiobacilus ferrooxidans. All these vessels were equipped with devices for introducing air from below and with stirrers.

3. A 250 liter storage container.
4. A 25 liter reactor-autoclave allowing to heat up and to stir the solution inside it at a temperature range from 65 up to 125° C.
5. A filter device, consisting of a vacuum pump, funnel of Buhner and vessels of 5 liters each for the filtrate's collection.
6. A drying vacuum—oven.
7. A muffler for the pigment's calcination.

Prior to the beginning of the experiments three fermenter vessels were filled with a ferrous sulfate solution containing 17 g of iron in 1 liter, in which all necessary vitally important components were added (Silverman M, and Zundgren D. Bacteriol . . .,1959, 77. 642p) and than the bacterias Thiobacilus ferrooxidans were added. These bacterias were taken from one sulfide copper deposit of Middle Asia. Into the prepared nutritious solution air was continuously supplied at the rate of 5-liters/h per 1 liter of solution. The quantity of bacterias cells inside the fermenter was determined indirectly on the quantity of oxidized iron $Fe^{2+}$ cations for a given time interval. Quantities of the iron's cations were determined every three hours by the chemical analysis. By earlier made experiments it was established, that if each three hours in fermenter there is the reduction 1 g/l of $Fe^{2+}$ as the bacterias quantity is no less $10^7$ cells in 1 ml of the solution The fermenter was ready to work when the $Fe^{2+}$ quantity in the third vessel has made less than 1 g/l of the solution.

The procedure was as follows:

Into the first 120 liter container there was introduced iron waste to fill about ⅔ of the container's volume and the container was filled with 100 liters of a ferric sulfate solution, containing 12 g/l of $Fe^{3+}$ at the pH 1.7. In time of the reaction the solution was continuously mixed by means of a centrifugal pump. During two hours there was allowed to occur a chemical reaction between the solution and metal iron according to the reaction scheme:

$Fe+Fe_2(SO_4)_3=3FeSO_4$

Upon the reaction's termination 100 liters of the ferrous sulfate's solution was produced. This solution contained 17 g/l of $Fe^{2+}$ at the pH 2.54.

The produced ferrous sulfate solution was continuously added into the first vessel of the fermenter during 2 hours and 30 minutes (about 40 l/h). During the given interval of time from the third capacity of the fermenter were formed and moved into the storage vessel 100 l of the completely oxidized solution contained 17 g/l of Fe3+at the pH 2.25. These 100 l of the ferric sulfate solution were filtered and the bacterias stayed on the filter membrane were recycled into the first vessel of the fermenter. Then this solution was divided into 5 parts of 20 liters each for reuse in further experiments.

EXAMPLE 1a

Production of Yellow Iron Oxide Pigment.

20 liters of the prepared ferric sulfate solution were filled into the reactor-autoclave and were heated to a temperature of about+120° C.[-]. After the achievement of the specified temperature the solution was maintained at said temperature for 30 minutes, and then the heating was stopped and the temperature was lowered during 1 hour to about+90° C. As a result a yellow iron oxide pigment was precipitated. The precipitate was filtered, washed to a pH of about 5.5 and dried. There was produced about 160 g of the dry yellow iron oxide pigment. According to X-ray diffraction this pigment is goethite (α-FeOOH). Under the scanning microscope it is represented by spheric particals with the size 20–120 nm. On the data of chemical analysis the remaining filtrate containing 12 g/l of $Fe^{3+}$ pH 1.7. The comparison of the produced yellow iron oxide pigment with the known yellow iron oxide pigments of Bayer's Ferox Inc. has shown that it does not correspond to any of them, as it differs by the spherical form of particles, while the yellow pigments of Bayer consist of only the needle or prismatic particles. For the manufacture of paint, pigments consisting of spherical particles are preferred. The produced pigment's chemical composition is the same as the Bayer's yellow iron oxide pigments. The produced yellow iron oxide pigment consists of 86.7% of $Fe_2O_3$ and 13% of the molecular water.

EXAMPLE 2

Production of the Red Iron Oxide Pigment

Also, 20 liters of the partially hydrolyzed ferric sulfate's solution from example 1a produced about 160 g of yellow iron oxide pigment. This pigment was calcined in a muffler at a temperature of about +700° C. during 30 min. As a result of the calcination the yellow pigment (x-goethite was transformed into red iron oxide—hematite ($Fe_2O_3$), as confirmed by X-ray diffraction. The pigment's weight was decreased to about 140 g. The particle form remained spherical, however the particle size decreased to about 10–80 nm. Chemical analysis of this pigment showed it to consist of 98.5–99.5% $Fe_2O_3$, which is more pure than the red micronized iron oxide pigments manufactured by Bayer Ferox Inc. The red iron oxide pigment can be used in the manufacture of high quality paints, as well as in the food and cosmetic industries.

EXAMPLE 3

Production of the Black Iron Oxide Pigment 20 liters of ferric sulfate solution containing 17 g/l of $^{3+}$ and 10 liters of ferrous sulfate's solution contained 17 g/l of $Fe^{2+}$ were mixed together. Then 0.4 liter of the 25% solution of $NH_4OH$ was added to the produced mixture. As a result of the chemical reaction a black precipitate was formed. This precipitate was then filtered, washed to a pH of about 7.0 and dried inside a vacuum -oven. The dry weight of pigment was 678 g. On the data of X-ray diffraction the produced precipitate is a magnetite ($Fe_3O_4$), consisting of spherical particles of a size of about 15–200 nm According to chemical analysis it consists of 98.7–99.5% of iron oxides, which is more pure than Bayer's black iron oxide pigments. It can be used for the manufacture of high quality paint or for the ink and cosmetic industries This method of black iron oxide pigment production is simpler and less expensive as compared to the conventional technology as described e.g. in U.S. Pat. Nos. 4,631,089 and 5,013,365.

EXAMPLE 4

Production of the Prussian Blue Pigment

To 20 liters of the ferric sulfate's solution containing 17 g/l of $Fe^{3+}$ was added a potassium ferrocyanide solution containing a stoichiometric amount for forming the Prussian blue quantities of this salt (1694 g of yellow potassium ferrocyanide ). As a result of chemical reaction a dark blue precipitate was formed the produced precipitate was separated from solution by filtration washed to a pH of about 5.5 and dried inside a vacuum-oven. The dry weight of pigment was 1310 g This dark blue pigment is Prussian blue. According to test results the produced Prussian blue is more stable in weakly alkaline conditions than Prussian blue produced by the conventional very expensive technology as described e.g. in U.S. Pat. Nos. 4,309,480, 4,113,508 and 4,378,995.

EXAMPLE 5

Production of the Anticorrosive Additive—Ferric Dihydrogen Phosphate

To 20 liters of ferric sulfate solution, containing 17 g/l of $Fe^{3+}$ at ambient temperature was added a solution containing a stoichiometric quantity of potassium monophosphate (416 g of potassium monophosphate). As a result of the chemical reaction a white precipitate was formed. This precipitate is ferric dihydrogen phosphate. The produced precipitate was separated from the solution, washed to a pH of about 5.5 and dried. The dried weight of precipitate was 976 g. It can be used as an excellent white anticorrosive additive in anticorrosive paints and coatings manufacturing.

As will be realized from the above examples, the present process provides a simplified and inexpensive procedure for the manufacture of iron-based pigments and anticorrosive additives from elemental iron. The process is environmentally clean and is based on recycling of by-products and undesirable reaction products such as ferric sulphate and sulphuric acid.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for the production of iron based pigments and anticorrosive additives from elemental iron comprising:
    a) reacting iron $Fe°$ with ferric sulphate $Fe_2(SO_4)_3$ and with sulfuric acid $H_2SO_4$ to produce ferrous sulphate $FeSO_4$;
    b) oxidizing ferrous sulphate $FeSO_4$ in a bacterial solution containing at least $10^7$ bacterial cells of thiobacillus ferrooxidans per 1 ml of solution under aerobic conditions to produce ferric oxide sulphate $Fe_2(SO_4)_3$;
    c) reacting said ferric sulphate $Fe_2(SO_4)_3$ with water at a temperature of about 65 to 130° C., to precipitate iron oxide monohydrate $Fe_2O_3 \times H_2O$; and
    d) re-cycling the solution from step c, to step a, to utilize the sulphuric acid and a portion of the ferrous sulphate values therein.

2. A process according to claim 1, wherein step a is carried out at a temperature of about 10 to 35° C. and a pH of about 1.0 to 2,9.

3. A process according to claim 1, wherein step b is carried out at a temperature of about 10 to 28° C. and a pH of about 1.0 to 2.9.

4. A process according to claim 1, wherein step c is carried out at a pH of about 1.5 to 1.8.

5. A process according to claim 1, wherein said iron oxide monohydrate precipitate of step c is subjected to the further step of
    e) filtration and washing to produce a yellow iron oxide pigment.

6. A process according to claim 5, wherein the product of step d is subjected to calcination at a temperature of about 400–800° C. to produce red iron oxide $Fe_2O_3$ powder.

7. A process according to claim 1, wherein a portion of the ferric oxide sulphate $Fe_2(SO_4)_3$ produced, is reacted with potassium ferrocyanide to produce a prussian blue pigment of the formula $Fe_4(Fe(CN)_6)_3$.

8. A process according to claim 1, wherein a portion of the ferric oxide sulphate $Fe_2(SO_4)_3$ produced and a stochiometric portion of ferrous sulphate are reacted with ammonium hydroxide to produce a black iron oxide of the formula $Fe_3O_4$.

9. A process for the production of iron based pigments and anticorrosive additives from elemental iron comprising:
    a) reacting iron $Fe°$ with ferric sulphate $Fe_2(SO_4)_3$ and with sulfuric acid $H_2SO_4$ to produce ferrous sulphate $FeSO_4$:
    b) oxidizing ferrous sulphate $FeSO_4$ in a bacterial solution containing sulfuric acid and at least $10^7$ bacterial cells of thiobacillus ferrooxidans per 1 ml of solution under aerobic conditions to produce ferric sulphate $Fe_2(SO_4)_3$; and
    c) reacting said ferric sulphate $Fe_2(SO_4)_3$ with potassium dihydrogen phosphate ($KH_2PO_4$) to produce a white anticorrosive additive of the formula $Fe(H_2PO_4)_3$.

* * * * *